Dec. 4, 1962 J. J. A. P. VAN AMSTEL 3,067,368
SEMI-CONDUCTOR BARRIER-LAYER SYSTEM
Filed Sept. 14, 1959
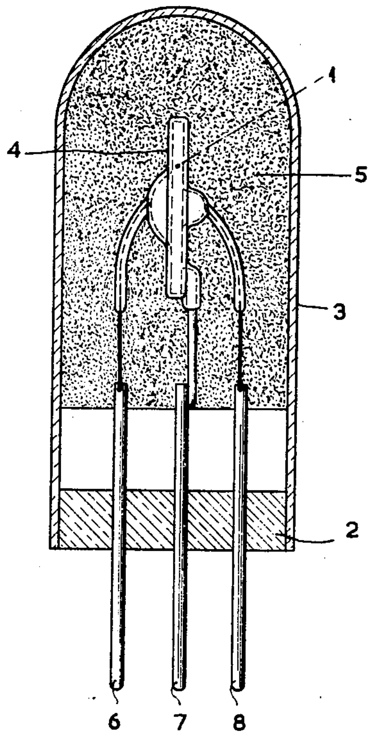
INVENTOR
Johannes Jacobus Asuerus Ploos van Amstel
BY
Frank R. Jifari
AGENT United States Patent Office 3,067,368

Patented Dec. 4, 1962

3,067,368
SEMI-CONDUCTOR BARRIER-LAYER SYSTEM

Johannes Jacobus Asuerus Ploos van Amstel, Eindhoven, Netherlands, assignor to North American Philips Company, Inc., New York, N.Y., a corporation of New York Filed Sept. 14, 1959, Ser. No. 839,932
Claims priority, application Netherlands Sept. 16, 1958
6 Claims. (Cl. 317—234)

The invention relates to a semi-conductor barrier-layer system, in particular a transistor or crystal diode, and to a method for the manufacture thereof.

As is known, the electrical properties of semi-conductor barrier-layer systems, for example those of which the semi-conductor body consists of germanium or silicon, are highly dependent upon gases or vapours, for example water vapour, which may be present in the environment of the surface. If, now, such barrier-layer systems are mounted in a hermetically sealed or even vacuum-tight envelope, it is found that the electrical properties, for example the current amplification factor in transistors and the leakage current in crystal diodes, may greatly vary in course of time. When the barrier-layer systems are heated to a high temperature, for example 80° C., or if a heavy electrical load is imposed on them, it is found that the electrical properties deteriorate increasingly, and this is presumably due to alterations in the occupation and state of the semi-conductor surface which may occur under these circumstances, similar alterations in electrical properties corresponding therewith.

It is an object of the present invention to provide a simple measure by which the stability of the electrical properties of a semi-conductor barrier-layer system can be appreciably improved.

In a semi-conductor barrier-layer system, in particular a transistor or crystal diode, in accordance with the invention, for this purpose the outer surface of the semi-conductor barrier-layer system proper, at least the semi-conductor surface thereof, is coated with an organic substance which adheres to the semi-conductor surface as a thin layer of thickness of one or at most a few molecules. In general, such layers preferably have a substantially non-polar character. The term "barrier-layer system proper" as used herein is to be understood to mean the semi-conductor body together with the electrodes and supply leads necessary for its operation, so far as they are present within the envelope. The expression "organic substance" is to be interpreted in the broadest sense and hence also includes the so-called organo-metallic compounds. The organic substances concerned are also known as means for rendering surfaces, in particular glass surfaces, water repellent. They generally include at least one group which adheres to the semi-conductor surface, for example by a chemical bond, at least one other non-polar group in the substance being directed outwards so that the character of the outer surface becomes predominantly non-polar. Thus, by coating the semi-conductor body with such a substance, presumably the outer surface is brought in a condition in which the influence of the ambient circumstances and changes therein is reduced. Consequently, the stability is increased, as is found in practice when using such substances. Although this explanation is presumably correct, the invention is not dependent thereon. Furthermore, it has been found in practice that many of these substances also exert a favourable influence upon the semi-conductor surface and hence improve the electrical properties, for example, the current-amplification factor in transistors.

Satisfactory results were obtained with substances from the group of the organohalogenosilanes, for example the alkylchlorosilanes such as trimethylmonochlorosilane or dimethyldichlorosilane. A satisfactory result was also obtained with phenyltrichlorosilane which also belongs to the above-mentioned group. Excellent results were also obtained with a substance having the above-mentioned properties, which is commercially available from Beckman Instruments, South Pasadena, California, U.S.A. under the trademark "Desicote," and which consists of a solution of about 20% of an organo-silicon-compound in about 80% carbontetrachloride.

Further examples of substances which can be used to great advantage are, for example, the group of the alkylalkoxysilanes, for example methyltriethoxysilane or dimethyl dibutoxysilane, and the group of the arylalkoxysilanes, such as for example phenyltriethoxysilane.

A similar satisfactory stabilising effect was also obtained with organic substances which belong to other groups and have the above-mentioned properties, for example p-nitrobenzylbromide, cetyltrimethylammonium-bromide, isopropoxytitanium oleate, isopropoxytitanium stearate and tri-ethanolaminotitanate-N-stearate, and an organic substance being commercially available under the trademark "Volan," and consisting of a solution of a methaerylic acid-chromichloride-complex (about 20%) in 45–47% isopropylalcohol, 9–11% acetone and 27–29% water.

Satisfactory results are also obtainable with some higher fatty acids of salts or esters thereof, of which in particular stearic acid proved to be highly suitable. Palmitic acid also proved to be suitable.

In many cases, the application of the layer concerned to the semi-conductor surface can be simply effected by immersion in a suitable solvent containing the organic substance to be applied, in a manner similar to that generally used in coating other surfaces, such as glass surfaces, with such layers. Furthermore, many substances can be applied to the semi-conductor surface via the vapour phase for example the above-mentioned group of the organo halogeno silanes. For some substances it is of advantage for this treatment to be succeeded by a treatment in an atmosphere containing water vapour in order to remove any residual reactive groups. With the above-mentioned higher fatty acids, in particular with stearic acid, less satisfactory results with respect to the leakage current were obtained by immersion, so that preferably the stearic acid is brought into contact with the semi conductor surface sparingly. A suitable method is that in which a store of stearic acid is introduced in the envelope, preferably so that the stearic acid store comes into contact with the semi-conductor either indirectly or diluted. This may be ensured by providing a mixture of stearic acid and a filler, for example silicon-vacuum grease, in the envelope around the barrier-layer system proper, the admixture of stearic acid to the filler preferably being only a few percent by weight for example from 1 to 10% by weight, preferably from 1 to 5% by weight. Another suitable method is that in which the stearic acid is provided within the envelope so as to be separated from the barrier-layer system proper by a porous wall, which may consist of quartz wool or asbestos. With stearic acid, in general it proved to be favourable with respect to the leakage current for the barrier-layer system proper to be previously provided with a protective layer, for example a lacquer layer. It has been found that the stearic acid is capable of penetrating through the lacquer layer, in particular when heated to a temperature of from 60° C. to 150° C., and consequently of exerting its stabilising influence upon the semi-conductor surface.

With respect to the further process of mounting the semi-conductor barrier-layer systems, it should be noted that they are preferably disposed in a hermetically sealed envelope. Particularly satisfactory results have been obtained with semi-conductor barrier-layer systems in accordance with the invention which had been sealed in vacuum-tight glass envelopes. For such barrier-layer systems the invention is of particular importance, since the electrical properties of the known barrier-layer systems generally are greatly deteriorated by the high sealing temperature, whereas by the use of the invention the electrical properties, even if they should still deteriorate during sealing-in, generally can be restored to their original level by a subsequent stabilisation treatment. As gas filling, use can be made of the conventional gases such as nitrogen, hydrogen, rare gases or mixtures thereof. Satisfactory results have also been obtained with air.

According to a further aspect of the invention relating to the method of manufacturing such semi-conductor barrier-layer systems, after the barrier-layer system has been mounted it is preferably stabilised by heating to a suitable temperature, for example between 60° C. and 150° C. It depends upon the substance used which stabilisation temperature is most suitable. Thus, for "Desicote" and stearic acid, a temperature of 140° C. proved highly suitable. The lower the stabilisation temperature chosen, the longer generally is the required stabilisation period. However, the stabilisation period cannot be made arbitrarily high but depends upon the substance concerned.

In order that the invention may readily be carried out, it will now be described more fully with reference to a figure and some examples.

The single FIGURE of the drawing shows diagrammatically a longitudinal sectional view of an embodiment of a barrier-layer system in accordance with the invention. The semi-conductor barrier-layer system 1 proper is disposed in a glass vacuum-tight envelope comprising two parts, a base 2 and a bulb 3, which are fused to one another. According to the invention the semi-conductor surface is coated with an organic substance which forms an extremely thin layer 4 of thickness of one or at most a few molecules on the semi-conductor and hence presumably imparts a predominantly non-polar character to the outer surface. In the figure, the layer 4 is shown to a greatly enlarged scale. The remainder 5 of the space within the envelope is filled with a filler, such as silicon vacuum grease. The electrodes of the barrier-layer system are connected to supply leads 6, 7, 8 which are brought out through the glass base 2. Obviously, within the envelope of a barrier-layer system according to the invention there may also be provided a greater amount of the organic substance concerned, for example in the cases where the provision of the substances concerned prior to the application is desired, for example in the case of stearic acid. As an alternative, if the organic substance concerned is not at all detrimental to the system, the barrier-layer system may be surrounded with a thicker layer of the organic substance concerned. However, due to the characteristic properties of the substances in accordance with the invention, only a very thin film of this thick layer of a thickness of one or at most a few molecules, adheres to the semi-conductor surface, which is comparatively loosely surrounded by the remainder of the layer. Hence, the remainder of the layer can be simply removed.

Now two embodiments of transistors in accordance with the invention will be described more fully by way of example.

*Example 1*

A p-n-p-germanium transistor consisting of a thin semi-conductor germanium wafer to which an emitter and a collector were alloyed opposite one another, a base contact being provided laterally thereof, after the final etching process was immersed at room temperature in an organic substance commercially available under the trademark "Desicote" for about 10 minutes. After this treatment, the transistor was sealed, in the manner shown in the figure, in a glass-vacuum-tight envelope which was filled with silicon vacuum grease which previously had been dried at 100° C. for 24 hours.

After sealing-in, the current amplification factor $\alpha_{bc}$ of this transistor was 55. Then the transistor was heated to 140° C. for 5000 hours. After 1000, 2000, 3000, 4000 and 5000 hours, the heating was interrupted in order to measure the current amplification factor of the transistor which was cooled to room temperature. This factor was 82, 81, 83, 81 and 81, respectively. Hence, the stability of this transistor in accordance with the invention was particularly satisfactory. The leakage current and the noise were also stable and very low.

Similar advantageous stabilisation results were obtained with germanium transistors by applying in a similar way instead of "Desicote" the following substances in a solvent, such as toluene: trimethylmonochlorosilane, dimethyl dichlorosilane and methyltriethoxysilane.

*Example 2*

Another p-n-p alloy transistor of which the semi-conductor body likewise consisted of germanium, was sealed in a glass vacuum-tight envelope of the kind shown in FIGURE 1, which previously had been filled to approximately 60% with a mixture of silicon vacuum grease and stearic acid (3% by weight) which previously had been dried at 100° C. for 24 hours. After sealing-in, the current amplification factor $\alpha_{bc}$ of this transistor was 90. Then the transistor was heated to 140° C. for 6 hours, after which the current amplification factor had increased to 203. Subsequently the transistor was subjected to an endurance test which comprised heating to 85° C. for 2000 hours, the current-amplification factor of the transistor which each time was cooled to room-temperature, being measured after 100, 500, 1000 and 2000 hours. This factor was 200, 202, 200 and 201, respectively. The leakage current and the noise were also low and stable. Comparative tests in which the germanium transistor was mounted similarly with a stearic acid store, with only this difference that the transistor had previously been coated with a lacquer layer (trademark of the lacquer "HK 15") and dried in this condition at 100° C. for 24 hours, showed similar favourable results. Similar favourable results were also obtained with such transistors in which the stearic acid store (10 mg.) was provided in the envelope so as to be separated from the barrier-layer system proper by a wad of quartz wool, the remainder of the envelope being filled with dried sand. With a stabilisation temperature of 140° C., the stabilisation time generally was from 5 to 50 hours.

Finally, it should be pointed out that the invention although it is particularly suitable for a p-n-p transistor structure, is not restricted thereto. The invention can also be used to high advantage for stabilising crystal diodes and n-p-n transistors. The invention is not restricted to germanium. It can also be used to great advantage with barrier-layer systems of which the same semi-conductor bodies consist of silicon; when applied to other semi-conductors, such as the semi-conductor compounds, in particular the $A_{III}B_V$ compounds, for example GaAs, InP and the like, similar favourable results can be expected.

What is claimed is:

1. A semiconductor device comprising a semiconductive body and contacts thereto, and a thin adherent coating on the outer surfaces of said body of at most the thickness of several molecules, said adherent coating being constituted of a monomeric organic stearate.

2. A semiconductor device comprising a hermetically-sealed envelope, a semiconductive body containing a p-n junction and contacts thereto within the envelope, and a thin, adherent coating on the outer surfaces of said body of at the most the thickness of several molecules, said adherent coating being constituted of stearic acid.

3. A transistor device comprising a hermetically-sealed envelope, a semiconductive body selected from the group consisting of germanium and silicon and contacts thereto within the envelope, a coating on the outer surfaces of said body of at most the thickness of several molecules, said adherent coating being constituted of a monomeric organic material having an inner group chemically bonded to the body surfaces and an outer, non-polar, moisture-repellent group, and a supply of stearic acid within the envelope.

4. A transistor of the p-n-p type as set forth in claim 3.

5. A semiconductor device comprising a hermetically-sealed envelope, a semiconductive body containing a p-n junction and contacts thereto within the envelope, and a thin, adherent coating on the outer surfaces of said body of at most the thickness of several molecules, said adherent coating being constituted of a monomeric organic oleate.

6. A semiconductor device comprising a hermetically-sealed envelope, a semiconductive body containing a p-n junction and contacts thereto within the envelope, and a thin, adherent coating on the outer surfaces of said body of at most the thickness of several molecules, said adherent coating being constituted of palmitic acid.

References Cited in the file of this patent

UNITED STATES PATENTS

| | | |
|---|---|---|
| 2,813,326 | Liebowitz | Nov. 19, 1957 |
| 2,836,878 | Shepard | June 3, 1958 |
| 2,874,076 | Schwartz | Feb. 17, 1959 |
| 2,879,457 | Wolsky | Mar. 24, 1959 |
| 2,906,931 | Armstrong | Sept. 29, 1959 |
| 2,913,358 | Harrington et al. | Nov. 17, 1959 |
| 2,963,630 | Irvine | Dec. 6, 1960 |
| 2,972,092 | Nelson | Feb. 14, 1961 |